United States Patent
Trueba et al.

(10) Patent No.: US 11,176,224 B2
(45) Date of Patent: Nov. 16, 2021

(54) SECURITY TOOL

(71) Applicant: Bank of America Corporation, Charlotte, NC (US)

(72) Inventors: Rodney Martin Trueba, Marietta, GA (US); Eric Choi, Old Tappan, NJ (US); Timothy Martin Golden, Oakland, CA (US)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 16/189,075

(22) Filed: Nov. 13, 2018

(65) Prior Publication Data
US 2020/0151304 A1 May 14, 2020

(51) Int. Cl.
| | | |
|---|---|---|
| *G06F 21/10* | (2013.01) | |
| *G06F 21/57* | (2013.01) | |
| *G06F 8/61* | (2018.01) | |
| *H04L 29/08* | (2006.01) | |
| *G06F 21/56* | (2013.01) | |
| *G06F 21/31* | (2013.01) | |
| *G06F 8/65* | (2018.01) | |

(52) U.S. Cl.
CPC ............... *G06F 21/105* (2013.01); *G06F 8/61* (2013.01); *G06F 8/65* (2013.01); *G06F 21/31* (2013.01); *G06F 21/563* (2013.01); *G06F 21/564* (2013.01); *G06F 21/57* (2013.01); *H04L 67/34* (2013.01)

(58) Field of Classification Search
CPC ...... G06F 21/105; G06F 21/57; G06F 21/563; G06F 21/564; G06F 21/31; G06F 8/61; G06F 8/65; G06F 21/10; H04L 67/34; H04M 1/72406
See application file for complete search history.

(56) References Cited

U.S. PATENT DOCUMENTS

| | | | |
|---|---|---|---|
| 7,506,053 B1 | 3/2009 | Qin | |
| 7,506,244 B1 | 3/2009 | Qin et al. | |
| 7,734,549 B2 | 6/2010 | Dabbish et al. | |
| 2013/0167135 A1* | 6/2013 | Neumann | G06F 9/44552 717/174 |
| 2017/0060568 A1* | 3/2017 | Seibert, Jr. | G06F 8/65 |
| 2018/0173517 A1* | 6/2018 | Shantharam | G06F 8/65 |
| 2021/0089290 A1* | 3/2021 | Yoo | G06F 8/61 |

* cited by examiner

*Primary Examiner* — Kevin Bechtel
*Assistant Examiner* — Sangseok Park
(74) *Attorney, Agent, or Firm* — Michael A. Springs (57) ABSTRACT

A memory stores a catalog of applications and a catalog of trusted sources. A processor detects that a first user attempted to install an application, determines that a source of the application is in the catalog of trusted sources, scans the application to determine that the application does not contain a virus, and determines that there is a first license that allows the first user to install the application. The processor also stores the application into a repository and adds the application to the catalog of applications. The processor receives a request from a second user to install the application, determines that the application is in the catalog of applications, and determines that there is a second license that allows the second user to install the application. The processor further retrieves the application from the repository and initiates installation of the application on a device of the second user.

20 Claims, 3 Drawing Sheets

SECURITY TOOL

TECHNICAL FIELD

This disclosure relates generally to network and computer security.

BACKGROUND

Computers and mobile devices increasingly use applications from various sources to perform tasks. As the number of applications in a system grows, so does the risk of exposing the system to malware, viruses, and hacks.

SUMMARY OF THE DISCLOSURE

Computers and mobile devices increasingly use applications from various sources to perform tasks. For example, in an organization, users may download and install applications to their devices to perform personal or professional tasks. As the number of applications in a system grows, however, so does the risk of exposing the system to malware, viruses, and hacks. When users download and install applications from many different sources, these users expose their devices and the organization's systems to potential malware and viruses. Additionally, even if these applications and sources do not pose a risk of malware and viruses, they put an organization at risk of being noncompliant with licensing requirements. For example, the organization may have a license with a certain source to install an application a set number of times in the organization. When a user downloads and installs the application on his own device without alerting the organization, the organization may run afoul of the licensing requirements for that application or source. As a result, that application can shut down throughout the organization, which may expose the organization to further malware, viruses, and/or hacks.

This disclosure contemplates a security tool that addresses one or more of the above issues. Generally, the security tool detects when users are attempting to install applications and prevents them from doing so until the application has passed internal checks. For example, the security tool may determine that the source of the application is a trusted source and that the application does not contain malware or viruses. Additionally, the security tool may determine that sufficient licenses are available for the user to install the application. Even after all internal checks are passed, the security tool may still prevent the user from installing the application. Rather, the security tool may add the application to a catalog of applications and store the application in a repository. The user may then request that the application be installed from the repository. In response to the request, the security tool checks whether the application is in the catalog, whether the source of the application is still a trusted source, and whether there are licenses available to install the application. If so, then the security tool initiates installation of the application from the repository. In this manner, the security tool improves network and system security by ensuring that applications are safe before letting users install the applications. Additionally, the security tool improves network and system security by limiting and/or preventing downloads and installations from untrusted sources.

According to an embodiment, an apparatus includes a memory and a hardware processor. The memory stores a catalog of applications and a catalog of trusted sources. The processor detects that a first user attempted to install an application. In response to detecting that the first user attempted to install the application, the processor determines that a source of the application is in the catalog of trusted sources, scans the application to determine that the application does not contain a virus, and determines that there is a first license that allows the first user to install the application. In response to the determination that the source of the application is in the catalog of trusted sources, the determination that the application does not contain the virus, and the determination that there is the first license, the processor stores the application into a repository and adds the application to the catalog of applications. The processor receives a request from a second user to install the application. In response to the request, the processor determines that the application is in the catalog of applications and determines that there is a second license that allows the second user to install the application. In response to the determination that the application is in the catalog of applications and that there is the second license, the processor retrieves the application from the repository. The processor also initiates installation of the application on a device of the second user.

According to another embodiment, a method includes storing, by a memory, a catalog of applications and a catalog of trusted sources. The method also includes detecting, by a hardware processor communicatively coupled to the memory, that a first user attempted to install an application. The method further includes in response to detecting that the first user attempted to install the application, determining, by the hardware processor, that a source of the application is in the catalog of trusted sources, scanning, by the hardware processor, the application to determine that the application does not contain a virus, and determining, by the hardware processor, that there is a first license that allows the first user to install the application. The method also includes in response to the determination that the source of the application is in the catalog of trusted sources, the determination that the application does not contain the virus, and the determination that there is the first license, storing, by the hardware processor, the application into a repository and adding the application to the catalog of applications. The method further includes receiving, by the hardware processor, a request from a second user to install the application. The method also includes in response to the request, determining, by the hardware processor, that the application is in the catalog of applications and determining, by the hardware processor, that there is a second license that allows the second user to install the application. The method further includes in response to the determination that the application is in the catalog of applications and that there is the second license, retrieving, by the hardware processor, the application from the repository. The method also includes initiating, by the hardware processor, installation of the application on a device of the second user.

According to yet another embodiment, a system includes a repository and a security tool. The security tool stores a catalog of applications and a catalog of trusted sources and detects that a first user attempted to install an application. In response to detecting that the first user attempted to install the application, the security tool determines that a source of the application is in the catalog of trusted sources, scans the application to determine that the application does not contain a virus, and determines that there is a first license that allows the first user to install the application. In response to the determination that the source of the application is in the catalog of trusted sources, the determination that the application does not contain the virus, and the determination that there is the first license, the security tool stores the application into a repository and adds the application to the catalog of applications. The security tool also receives a request from a second user to install the application. In response to the request, the security tool determines that the application is in the catalog of applications and determines that there is a second license that allows the second user to install the application. In response to the determination that the application is in the catalog of applications and that there is the second license, the security tool retrieves the application from the repository. The security tool further initiates installation of the application on a device of the second user.

Certain embodiments provide one or more technical advantages. For example, an embodiment improves the security of a system or network by limiting or preventing downloads from untrusted sources. As another example, an embodiment improves system or network security by forcing installations from a repository of safe applications. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
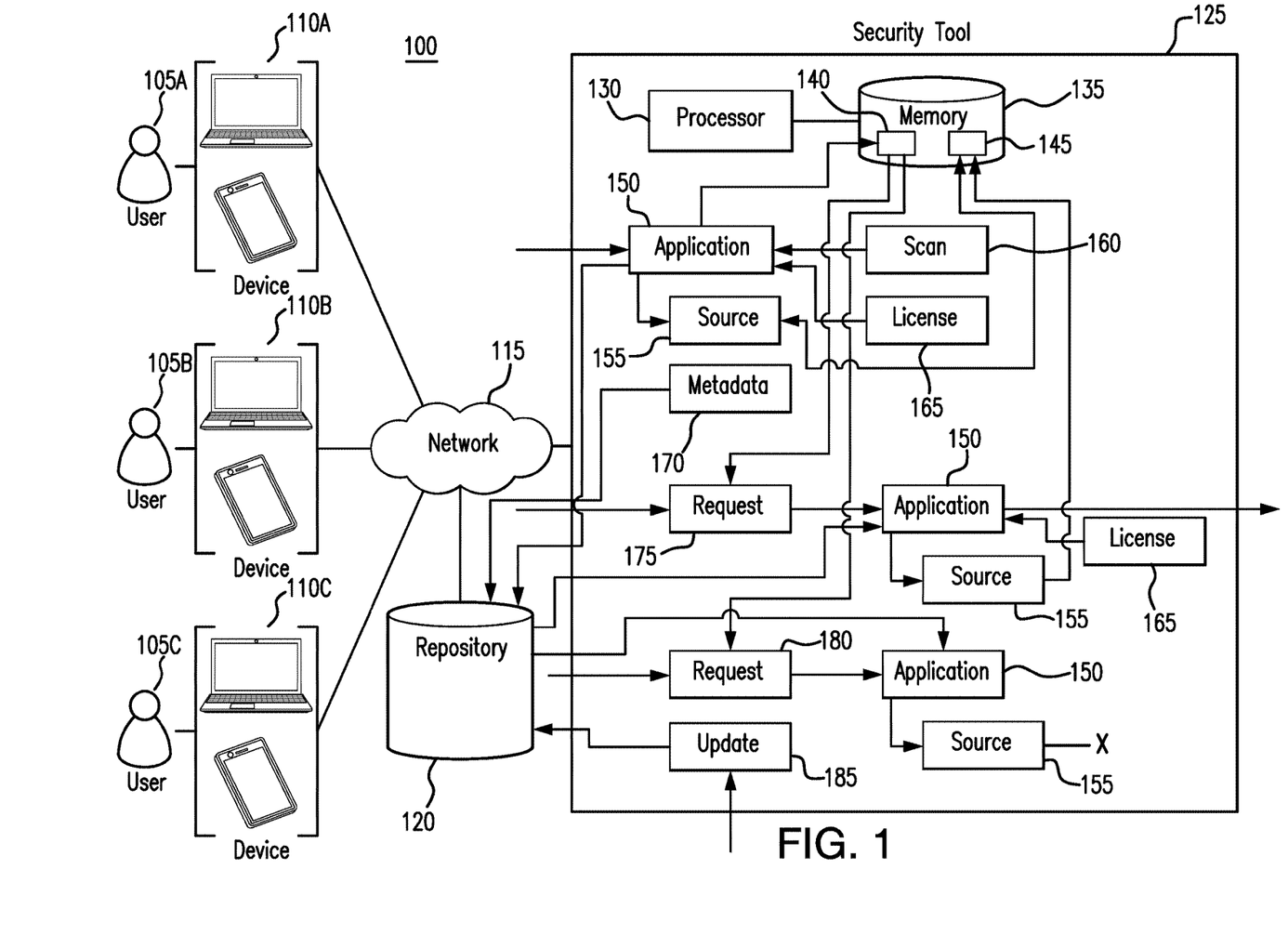
FIG. 1 illustrates an example system.
Figure 2:
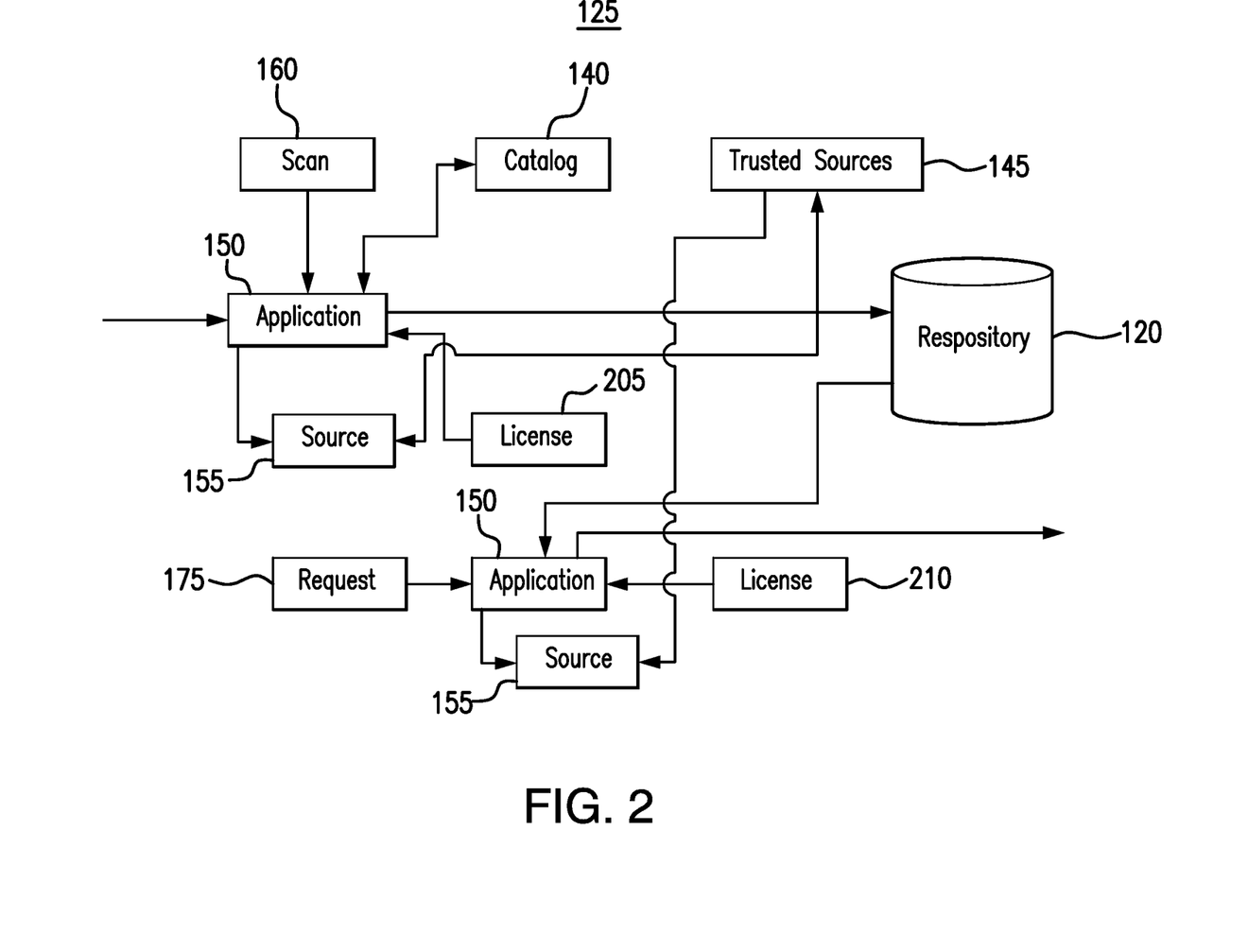
FIG. 2 illustrates an example security tool of the system of FIG. 1.
Figure 3:
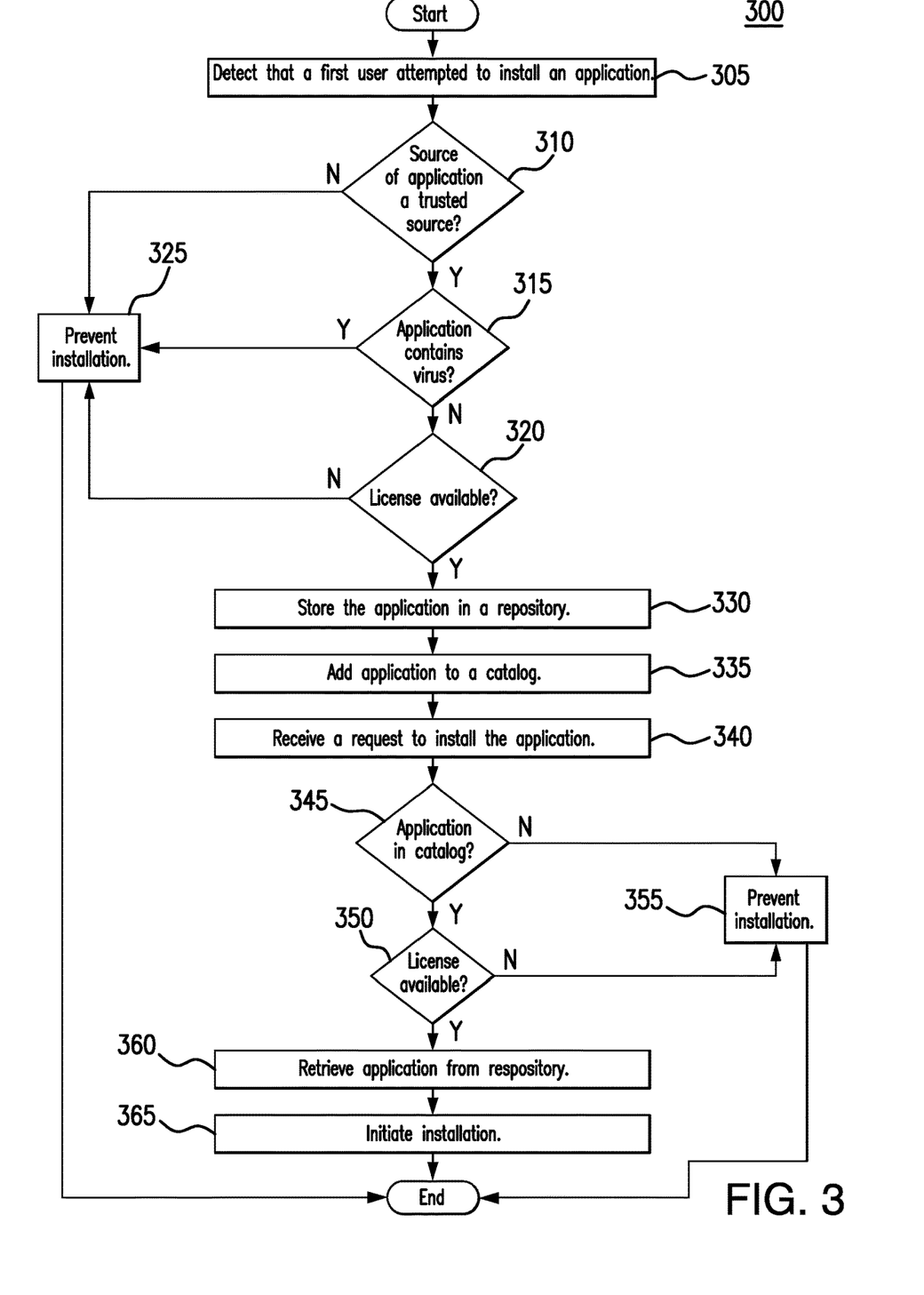
FIG. 3 is a flowchart illustrating a method for improving network security using the system of FIG. 1.

Embodiments of the present disclosure and its advantages are best understood by referring to FIGS. 1 through 3 of the drawings, like numerals being used for like and corresponding parts of the various drawings.

Computers and mobile devices increasingly use applications from various sources to perform tasks. For example, in an organization, users may download and install applications to their devices to perform personal or professional tasks. As the number of applications in a system grows, however, so does the risk of exposing the system to malware, viruses, and hacks. When users download and install applications from many different sources, these users expose their devices and the organization's systems to potential malware and viruses. Additionally, even if these applications and sources do not pose a risk of malware and viruses, they put an organization at risk of being noncompliant with licensing requirements. For example, the organization may have a license with a certain source to install an application a set number of times in the organization. When a user downloads and installs the application on his own device without alerting the organization, the organization may run afoul of the licensing requirements for that application or source. As a result, that application can shut down throughout the organization, which may expose the organization to further malware, viruses, and/or hacks.

This disclosure contemplates a security tool that addresses one or more of the above issues. Generally, the security tool detects when users are attempting to install applications and prevents them from doing so until the application has passed internal checks. For example, the security tool may determine that the source of the application is a trusted source and that the application does not contain malware or viruses. Additionally, the security tool may determine that sufficient licenses are available for the user to install the application. Even after all internal checks are passed, the security tool may still prevent the user from installing the application. Rather, the security tool may add the application to a catalog of applications and store the application in a repository. The user may then request that the application be installed from the repository. In response to the request, the security tool checks whether the application is in the catalog, whether the source of the application is still a trusted source, and whether there are licenses available to install the application. If so, then the security tool initiates installation of the application from the repository. In this manner, the security tool improves network and system security by ensuring that applications are safe before letting users install the applications. Additionally, the security tool improves network and system security by limiting and/or preventing downloads and installations from untrusted sources. The security tool will be described in more detail using FIGS. 1 through 3.

FIG. 1 illustrates an example system 100, as seen in FIG. 1, system 100 includes one or more devices 110, a network 115, a repository 120, and a security tool 125. Generally, security tool 125 verifies applications and their sources before the application can be installed on devices 110. Additionally, security tool 125 can verify licenses for the applications before they are installed. In this manner, security tool 125 improves the security of system 100 and network 115 by reducing the number of applications from untrusted sources installed in system 100 in certain embodiments.

Devices 110 are used by users 105 to communicate with other components of system 100. Users 105 can install applications on devices 110. Devices 110 can execute these applications to perform tasks over network 115. In some instances, users 105 can download applications to devices 110 through third-party websites. The applications that come from these sites may not be safe for network 115 and/or system 100. For example, the applications may contain malware, viruses, and/or code that makes network 115 and system 100 vulnerable to hacks. By downloading the application on devices 110 and then executing these applications, users 105 may expose network 115 and system 100 to security vulnerabilities. Thus, it is important to prevent and/or limit the ability of users 105 and devices 110 to download applications from third-party sites and/or untrusted sources, but still make these applications available to users 105 and devices 110. In the illustrated example of FIG. 1, system 100 includes users 105A, 105B, and 105C. Each user uses one or more devices 110. For example, user 105A uses devices 110A, user 105B uses devices 110B, user 105C uses devices 110C. Each of these users 105 use their devices 110 to communicate over network 115.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Repository 120 is a database or any other suitable storage that contains applications that can be installed in system 100. Applications are placed into repository 120 when the applications are verified to be safe and secure. These applications can then be retrieved from repository 120 to be installed on devices 110 when requested. In this manner, repository 120 improves the security of network 115 and system 100 by storing safe applications for the components of system 100. By using repository 120, devices 110 may not need to download and install applications from third-party sites. Instead, devices 110 can install verified and safe applications from repository 120.

Security tool 125 verifies applications in system 100. As seen in FIG. 1, security tool 125 includes a processor 130 and a memory 135. This disclosure contemplates processor 130 and memory 135 being configured to perform any of the functions of security tool 125 described herein. Generally, security tool 125 verifies that an application and its source are safe. Additionally, security tool 125 can verify that there are suitable licenses to install an application on devices 110. After security tool 125 has verified an application, security tool 125 can store the application in repository 120. When a request to install the application is received, security tool 125 can retrieve the application from repository 120 and initiate installation of the application.

Processor 130 is any electronic circuitry, including, but not limited to microprocessors, application specific integrated circuits (ASIC), application specific instruction set processor (ASIP), and/or state machines, that communicatively couples to memory 140 and controls the operation of security tool 125. Processor 130 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of security tool 125 by processing information received from devices 110, network 115, and memory 140. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Security tool 125 stores in memory 135 a catalog 140 of applications. The applications identified in catalog 140 are verified applications that are available for installation. Additionally, the applications identified in catalog 140 are typically stored in repository 120. When an application is verified, security tool 125 adds an identifier for the application in catalog 140. When a request to install an application is received, security tool 125 references catalog 140 to determine whether the requested application is a verified application.

Security tool 125 stores a catalog 145 of trusted sources in memory 135. Each of the sources identified in catalog 145 is a trusted source. Applications that are produced by trusted sources are typically safe. Additionally, applications that are downloaded from trusted sources are typically safe. When an application is verified, security tool 125 may also verify whether the source of the application is identified in catalog 145, and security tool 125 may determine that the source has been verified. When security tool 125 verifies a new source, security tool 125 adds an identifier for the new source to catalog 145. When an application is requested to be installed, security tool 125 checks whether the source of the requested application is in catalog 145. If the source is in catalog 145, then the source is a trusted source, which indicates that the requested application is likely safe. If the source of the requested application is not in catalog 145, security tool 125 may determine that the requested application is not safe.

Security tool 125 verifies applications before allowing the application to be installed in system 100. For example, security tool 125 can detect that a device 110 downloaded an application over network 115. As another example, security tool 125 can detect that device 110 is attempting to install an application. When security tool 125 detects a download or an attempted install of an application, security tool 125 may prevent the installation or download of the application until the application is verified. In the illustrated example of FIG. 1, security tool 125 detects that an application 150 is being downloaded or installed on device 110A. User 105A may have attempted to download or install application 150 on device 110A before application 150 has been verified by security tool 125. Security tool 125 performs various checks on application 150. For example, security tool 125 checks to see whether application 150 is identified in catalog 140. Additionally, security tool 125 checks whether a source 155 of application 150 is identified in catalog 145.

If application 150 and source 155 are not identified in catalog 140 and 145, security tool 125 may perform further checks on application 150 and source 155 to verify them. For example, security tool 125 can perform a scan 160 on application 150. Scan 160 may reveal whether application 150 includes malware or viruses that could pose a security risk to network 115 or security 100. Scan 160 may be a security scan, a vulnerability scan, a virus scan, or any other suitable scan. Additionally, security tool 125 can check whether source 155 is a legitimate source and whether it should be a trusted source.

In certain embodiments, security tool 125 also verifies that a license 165 to install application 150 exists. For example, license 165 may allow user 105A that was attempting to install application 150 to install the application 150. By ensuring that license 165 exists, security tool 125 ensures that system 100 does not run afoul of any licensing requirements of application 150 or source 155.

When security tool 125 has verified application 150 and/or source 155, security tool 125 adds application 150 to catalog 140. Security tool 125 also adds source 155 to catalog 145. In this manner, catalogs 140 and 145 reflect that application 150 and source 155 have been verified.

After application 150 and source 155 are verified and identified in catalogs 140 and 145, security tool 125 can store application 150 in repository 120 for future retrieval and installation. After application 150 is stored in repository 120, any suitable number of users 105 can subsequently request that application 150 be installed on their devices 110.

In certain embodiments, security tool 125 further authenticates user 110A before adding application 150 to catalog 140, adding source 155 to catalog 145, or storing application 150 in repository 120. In this manner, security tool 125 provides an additional layer of security to ensure that device 110A has not been hacked. As a result, security tool 125 improves the security of network 115 and system 100 by ensuring that user 105A is the one who is actually requesting the download or installation of application 150.

If security tool 125 does not verify application 150 or source 155, then security tool 125 may prevent user 105A from downloading or installing application 150 on device 110A. Security tool 125 may refuse to add application 150 to catalog 140 and source 155 to catalog 145. For example, if security tool 125 determines that application 150 includes a virus or malware, security tool 125 may not verify application 150. As another example, if security tool 125 determines that source 155 is not a trusted source, then security tool 125 may not verify source 155. As yet another example, security tool 125 may determine that license 165 does not exist to install application 150. As a result, security tool 125 may not verify application 150 for installation or download and prevents device 110A from downloading or installing application 150 on device 110A.

After an application has been verified, security tool 125 may allow the application to be installed. In the illustrated example of FIG. 1, security tool 125 receives a request 175 from user 105B or device 110B to install application 150. User 105B may use device 110B to communicate request 175 to security tool 125. When request 175 is received, security tool 125 may refer to catalog 140 to determine if the requested application 150 is identified in catalog 140. If application 150 is identified in catalog 140, security tool 125 retrieves application 150 from repository 120. Security tool 125 then checks whether source 155 of application 150 is identified in catalog 145. If source 155 is identified in catalog 145, security tool 125 may determine that source 155 is a trusted source. Security tool 125 may also determine whether license 165 exists to perform the requested installation. If license 165 exists, then security tool 125 may determine that application 150 can be installed without running afoul of any licensing requirements of source 155. Security tool 125 can then initiate installation of application 150.

In some embodiments, security tool 125 authenticates user 105B and/or device 110B before initiating the installation of application 150 on device 110B. In this manner, security tool 125 improves the security of network 115 and system 100 by ensuring that user 105B is the one who is actually requesting the installation and not an individual who has hacked device 110B.

As another example, security tool 125 can receive a request 180 from user 105C or device 110C. Request 180 may be requesting that application 150 be installed. Security tool 125 may refer to catalog 140 and determine that application 150 has been identified in catalog 140. As a result, security tool 125 may retrieve application 150 from repository 120. Security tool 125 may then verify whether source 155 is identified in catalog 145. A change may have occurred in catalog 145 that indicates that source 155 is no longer trusted. For example, an administrator may have determined that source 155 should not be identified in catalog 145. In response, security tool 125 may have removed source 155 from catalog 145. As a result, security tool 125 may determine that application 150 should not be installed on device 110C because source 155 is no longer a trusted source, and security tool 125 may prevent user 105C from installing application 150 onto device 110C.

As another example, security tool 125 may also determine that a license does not exist to install application 150 on device 110C. Thus, installing application 150 on device 110C would run afoul of licensing requirements of application 150 or source 155. As a result, security tool 125 may refuse to initiate installation of application 150 on device 110C.

In particular embodiments, security tool 125 may also store metadata 170 for application 150 in repository 120. In this manner, metadata 170 is available for application 150 when application 150 is requested to be installed at a subsequent time. Application 150 may use metadata 170 to complete installation and/or perform execution.

In certain embodiments, security tool 125 may perform updates on applications 150 stored in repository 120 to keep these applications 150 up to date. Security tool 125 may receive an update 185. Update 185 may indicate an application 150 that should be updated. Security tool 125 may then apply update 185 to the application 150 stored in repository 120. As a result, the application 150 stored in repository 120 is kept up to date for subsequent installation.

FIG. 2 illustrates an example security tool 125 of the system 100 of FIG. 1. Generally, security tool 125 verifies applications before allowing the applications to be downloaded or installed in system 100. In certain embodiments, security tool 125 improves the security of a network or system 100 by verifying that applications are safe and from trusted sources before allowing the applications to be downloaded or installed.

Security tool 125 maintains catalog 140. As described above, catalog 140 identifies applications that have been verified. Security tool 125 also maintains catalog 145 of trusted sources. As discussed above, catalog 145 identifies sources that have been verified to be safe.

Security tool 125 detects that application 150 is being downloaded or installed in system 100, for example, from a third-party site. Security tool 125 may stop the download or installation. Then, security tool 125 may verify application 150.

Security tool 125 may first refer to catalog 140 to determine whether application 150 is identified in catalog 140. If application 150 is identified in catalog 140, security tool 125 may determine that application 150 has been verified. If application 150 is not identified in catalog 140, security tool 125 may continue the verification process.

Security tool 125 may verify a source 155 of application 150 to see if source 155 is a trusted source. Security tool 125 may refer to catalog 145 to see whether source 155 is identified in catalog 145. If source 155 is identified in catalog 145, security tool 125 may determine that source 155 has been verified. If source 155 is not identified in catalog 145, security tool 125 may determine that source 155 is not a trusted source.

Security tool 125 may also perform a scan 160 on application 150 to verify application 150. Scan 160 may be a security scan, a vulnerability scan, and/or a virus scan. If scan 160 reveals that application 150 poses a risk to system 100, then security tool 125 may refuse to verify application 150. For example, if scan 160 reveals that application 150 includes a virus or malware, security tool 125 may refuse to verify application 150.

Security tool 125 may also determine that a license 205 exists that allows application 150 to be installed in system 100. If license 205 does not exist, then security tool 125 may refuse to verify application 150. If license 205 exists, security tool 125 may verify application 150 for installation.

If security tool 125 verified the application 150, security tool 125 may add an identifier for application 150 in catalog 140. Then, security tool 125 may store application 150 in repository 120 for subsequent retrieval and installation. Using the illustrated example of FIG. 2, if scan 160 reveals that application 150 does not pose a risk to system 100, license 205 exists, and source 155 is identified in catalog 145, security tool 125 may verify application 150 and add application 150 to catalog 140 and repository 120. If any of these checks fail, security tool 125 may refuse to verify application 150. Security tool 125 may refuse to add application 150 to catalog 140 and repository 120.

When a user subsequently requests to install application 150, security tool 125 may receive request 175. Request 175 may identify application 150 that is being requested for installation. Security tool 125 may refer to catalog 140 to see if application 150 is identified in catalog 140. If application 150 is not identified catalog 140, security tool 125 may deny request 175. If application 150 is identified in catalog 140, security tool 125 may retrieve application 150 from repository 120. Security tool 125 may then verify that source 155 of application 150 is identified in catalog 145 of trusted sources. Security tool 125 may also verify that a license 210 exists that allows the requested installation. If these checks pass, then security tool 125 authorizes and initiates the installation of application 150. If any of these checks fail, security tool 125 may refuse the requested installation. In this manner, security tool 125 improves the security of system 100 by preventing of limiting downloads and installations until an application has been verified to be safe.

FIG. 3 is a flowchart illustrating a method 300 for improving network security using the system 100 of FIG. 1. In particular embodiments, security tool 125 performs the steps of method 300. By performing method 300, security tool 125 improves the security of a network or system in certain embodiments.

Security tool 125 begins by detecting that a first user attempted to install an application in step 305. In step 310, security tool 125 determines whether the source of the application is a trusted source. If the source is a trusted source, security tool 125 determines whether the application contains a virus in step 315. If the application does not contain a virus, security tool 125 determines whether a license authorizing the installation is available in step 320. If security tool 125 determines that the source is a not a trusted source in step 310, or that the application contains a virus in step 315, or that no license is available in step 320, then security tool 125 prevents the installation in step 325.

If security tool 125 determines that the source is a trusted source in step 310, that the application does not contain a virus in step 315, and that the license is available in step 320, security tool 125 stores the application in a repository in step 330. The application can be retrieved for subsequent installation. In step 335, security tool 125 adds the application to a catalog. The catalog identifies the verified applications that are authorized for installation by security tool 125. In step 340, security tool 125 receives a request to install the application. The request may identify the application that is requested for installation.

Security tool 125 determines whether the requested application is in the catalog in step 345. Security tool 125 determines whether a license allowing the requested installation is available in 350. If security tool 125 determines that the application is not in the catalog in step 345 or if that the license is not available in step 350, security tool 125 may prevent the installation in step 355. If security tool 125 determines that the application is in the catalog in step 345 and that the license is available in step 350, security tool 125 retrieves the application from the repository in step 360. Security tool 125 then initiates installation of the requested application in step 365.

Modifications, additions, or omissions may be made to method 300 depicted in FIG. 3. Method 300 may include more, fewer, or other steps. For example, steps may be performed in parallel or in any suitable order. While discussed as automation tool 125 (or components thereof) performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store a catalog of applications and a catalog of trusted sources; and
   a hardware processor communicatively coupled to the memory, the hardware processor configured to:
   detect that a first user attempted to install an application from a third-party website that is distinct from the hardware processor of the apparatus;
   in response to detecting that the first user attempted to install the application:
   determine that a device associated with the first user has not been hacked based at least in part on an authentication of the first user;
   determine that a source of the application is in the catalog of trusted sources;
   scan the application to determine that the application does not contain a virus;
   and
   determine that there is a first license that allows the first user to install the application, wherein the determining that there is a first license is based in-part on a sufficient number of licenses available in an organization for the first user to install the application;

in response to the determination that the device associated with the first user has not been hacked, the determination that the source of the application is in the catalog of trusted sources, the determination that the application does not contain the virus, and the determination that there is the first license, store the application into a repository that is separate from the third-party website and add the application to the catalog of applications, wherein the catalog of applications identify verified applications that are available for installation from the repository;

receive a request from a second user to install the application;

in response to the request:
determine that a device associated with the second user has not been hacked;
determine that the application is in the catalog of applications; and
determine that there is a second license that allows the second user to install the application, wherein the determining that there is a second license is based in-part on a sufficient number of licenses available in the organization for the second user to install the application;

in response to the determination that the device associated with the second user has not been hacked, the determination that the application is in the catalog of applications and that there is the second license, retrieve the application from the repository; and
initiate installation of the application on the device of the second user.

2. The apparatus of claim 1, wherein the hardware processor is further configured to prevent the first user from downloading the application from the source.

3. The apparatus of claim 1, wherein the hardware processor is further configured to:
determine that the source which is in the catalog of trusted sources should be removed from the catalog of trusted sources; and
prevent a third user from installing the application based on the determination that the source should be removed from the catalog of trusted sources.

4. The apparatus of claim 1, wherein the hardware processor is further configured to:
determine that there is not a third license that allows a third user to install the application; and
prevent the third user from installing the application based on the determination that there is not the third license.

5. The apparatus of claim 1, wherein the hardware processor is further configured to:
determine that there is an update for the application; and
update the application in the repository in response to the determination that there is the update.

6. The apparatus of claim 1, wherein the hardware processor is further configured to:
authenticate the first user before storing the application in the repository; and
authenticate the second user before initiating installation of the application on the device.

7. The apparatus of claim 1, wherein the hardware processor is further configured to store metadata for the application in the repository.

8. A method comprising:
storing, by a memory, a catalog of applications and a catalog of sources;
detecting, by a hardware processor communicatively coupled to the memory, that a first user attempted to install an application from a third-party website that is distinct from the hardware processor;
in response to detecting that the first user attempted to install the application:
determining that a device associated with the first user has not been hacked based at least in part on an authentication of the first user;
determining, by the hardware processor, that a source of the application is in the catalog of trusted sources;
scanning, by the hardware processor, the application to determine that the application does not contain a virus; and
determining, by the hardware processor, that there is a first license that allows the first user to install the application, wherein the determining that there is a first license is based in-part on a sufficient number of licenses available in an organization for the first user to install the application;
in response to the determination that the device associated with the first user has not been hacked, the determination that the source of the application is in the catalog of trusted sources, the determination that the application does not contain the virus, and the determination that there is the first license, storing, by the hardware processor, the application into a repository that is separate from the third-party website and add the application to the catalog of applications, wherein the catalog of applications identify verified applications that are available for installation from the repository;
receiving, by the hardware processor, a request from a second user to install the application;
in response to the request:
determining, by the hardware processor, that a device associated with the second user has not been hacked;
determining, by the hardware processor, that the application is in the catalog of applications; and
determining, by the hardware processor, that there is a second license that allows the second user to install the application, wherein the determining that there is a second license is based in-part on a sufficient number of licenses available in the organization for the second user to install the application;
in response to the determination that the device associated with the second user has not been hacked, the determination that the application is in the catalog of applications and that there is the second license, retrieving, by the hardware processor, the application from the repository; and
initiating, by the hardware processor, installation of the application on the device of the second user.

9. The method of claim 8, further comprising preventing, by the hardware processor, the first user from downloading the application from the source.

10. The method of claim 8, further comprising:
determining, by the hardware processor, that the source which is in the catalog of trusted sources should be removed from the catalog of trusted sources; and
preventing, by the hardware processor, a third user from installing the application based on the determination that the source should be removed from the catalog of trusted sources.

11. The method of claim 8, further comprising:
determining, by the hardware processor, that there is not a third license that allows a third user to install the application; and
preventing, by the hardware processor, the third user from installing the application based on the determination that there is not the third license.

12. The method of claim 8, further comprising:
determining, by the hardware processor, that there is an update for the application; and
updating, by the hardware processor, the application in the repository in response to the determination that there is the update.

13. The method of claim 8, further comprising:
authenticating, by the hardware processor, the first user before storing the application in the repository; and
authenticating, by the hardware processor, the second user before initiating installation of the application on the device.

14. The method of claim 8, further comprising storing, by the hardware processor, metadata for the application in the repository.

15. A system comprising:
a repository; and
a security tool configured to:
store a catalog of applications and a catalog of trusted sources; and
detect that a first user attempted to install an application from a third-party website that is distinct from the security tool;
in response to detecting that the first user attempted to install the application:
determine that a device associated with the first user has not been hacked based at least in part on an authentication of the first user;
determine that a source of the application is in the catalog of trusted sources;
scan the application to determine that the application does not contain a virus; and
determine that there is a first license that allows the first user to install the application, wherein the determining that there is a first license is based in-part on a sufficient number of licenses available in an organization for the first user to install the application;
in response to the determination that the device associated with the first user has not been hacked, the determination that the source of the application is in the catalog of trusted sources, the determination that the application does not contain the virus, and the determination that there is the first license, store the application into a repository that is separate from the third-party website and add the application to the catalog of applications, wherein the catalog of applications identify verified applications that are available for installation from the repository;
receive a request from a second user to install the application;
in response to the request:
determine that a device associated with the second user has not been hacked;
determine that the application is in the catalog of applications; and
determine that there is a second license that allows the second user to install the application, wherein the determining that there is a second license is based in-part on a sufficient number of licenses available in the organization for the second user to install the application;
in response to the determination that the device associated with the second user has not been hacked, the determination that the application is in the catalog of applications and that there is the second license, retrieve the application from the repository; and
initiate installation of the application on the device of the second user.

16. The system of claim 15, wherein the security tool is further configured to prevent the first user from downloading the application from the source.

17. The system of claim 15, wherein the security tool is further configured to:
determine that the source which is in the catalog of trusted sources should be removed from the catalog of trusted sources; and
prevent a third user from installing the application based on the determination that the source should be removed from the catalog of trusted sources.

18. The system of claim 15, wherein the security tool is further configured to:
determine that there is not a third license that allows a third user to install the application; and
prevent the third user from installing the application based on the determination that there is not the third license.

19. The system of claim 15, wherein the security tool is further configured to:
determine that there is an update for the application; and
update the application in the repository in response to the determination that there is the update.

20. The system of claim 15, wherein the security tool is further configured to:
authenticate the first user before storing the application in the repository; and
authenticate the second user before initiating installation of the application on the device.

* * * * *